No. 721,469. PATENTED FEB. 24, 1903.
E. SCHENCK.
AUTOMATIC WEIGHING MACHINE.
APPLICATION FILED JAN. 7, 1901.
NO MODEL. 4 SHEETS—SHEET 1.
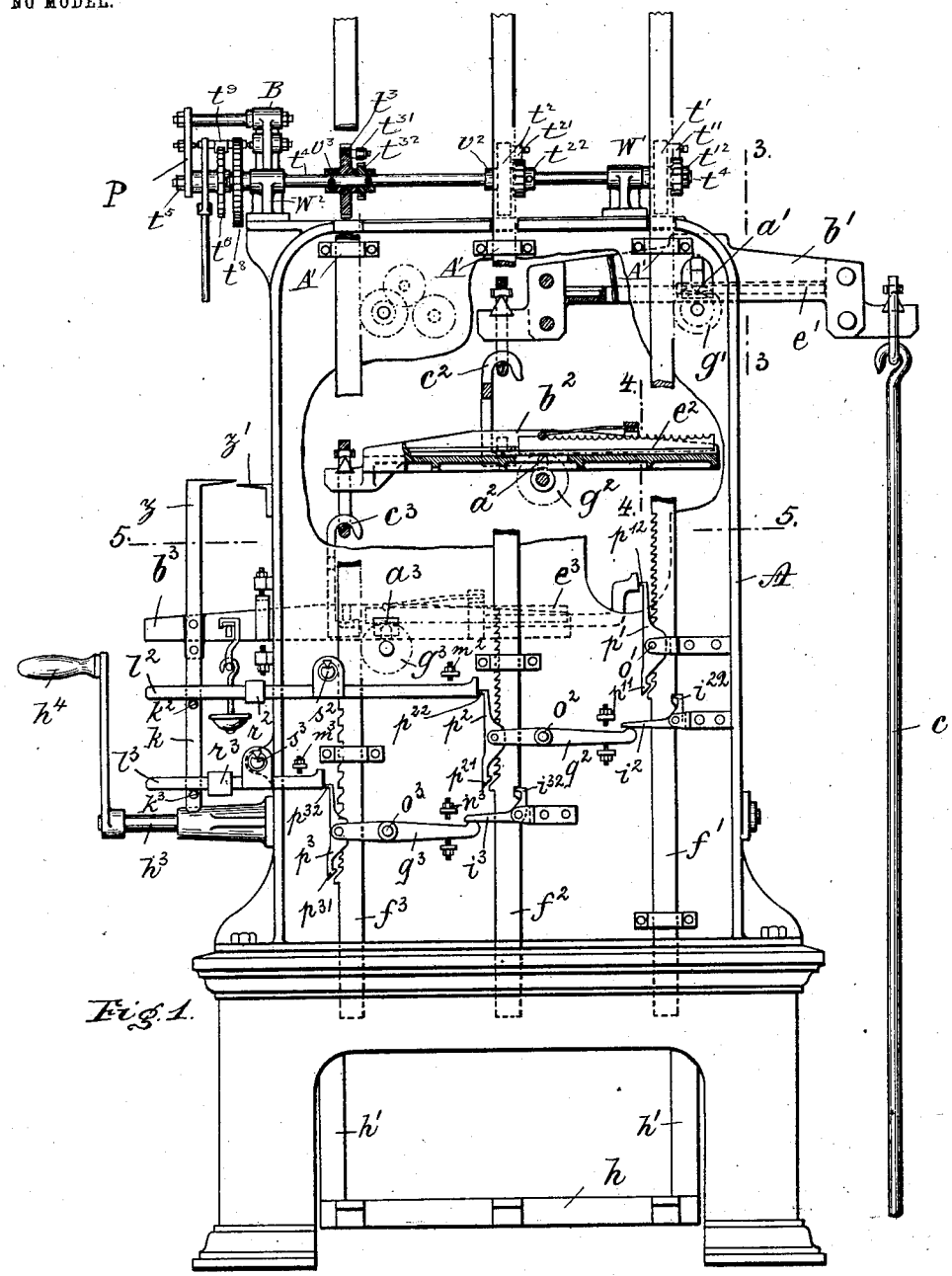
Fig. 1.
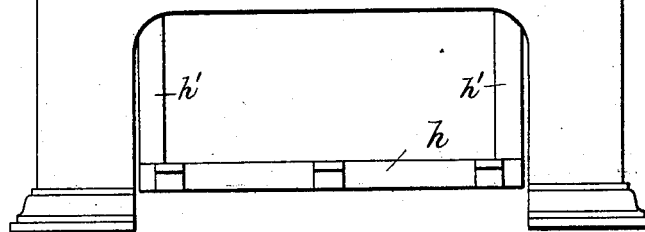
Fig. 6. Fig. 7.
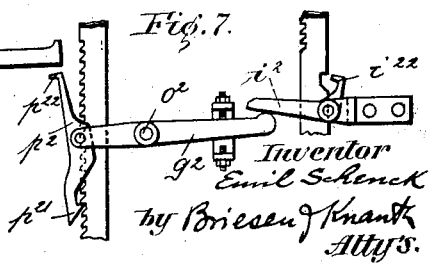
Witnesses
Inventor
Emil Schenck
by Briesen & Knauth
Atty's.

No. 721,469. PATENTED FEB. 24, 1903.
E. SCHENCK.
AUTOMATIC WEIGHING MACHINE.
APPLICATION FILED JAN. 7, 1901.
NO MODEL. 4 SHEETS—SHEET 2.
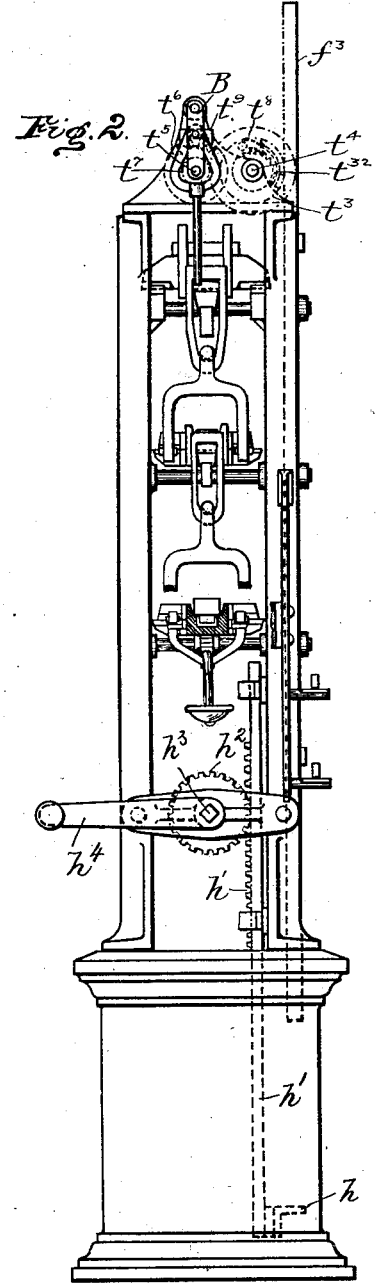
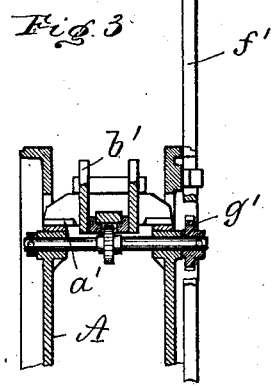
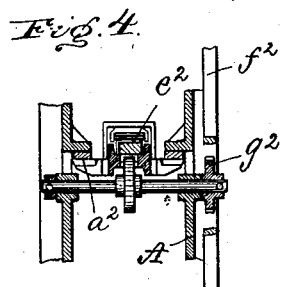
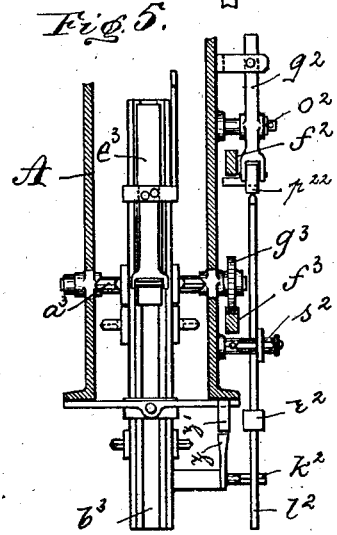

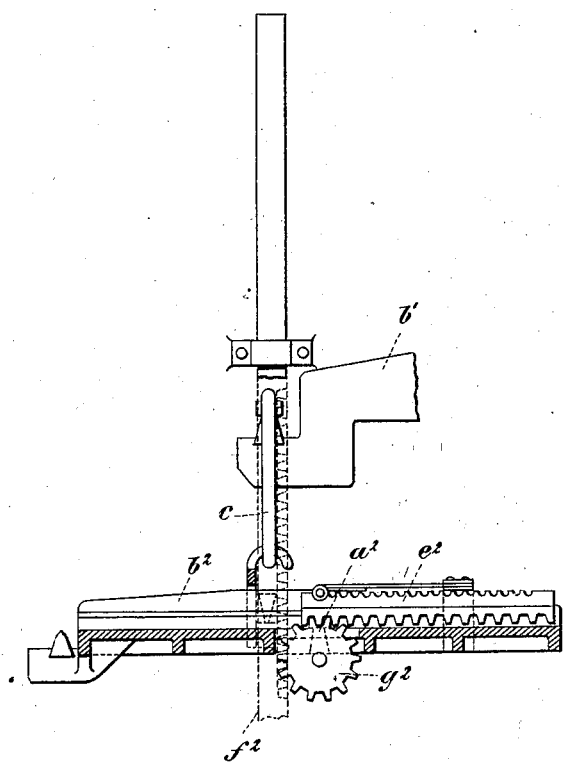

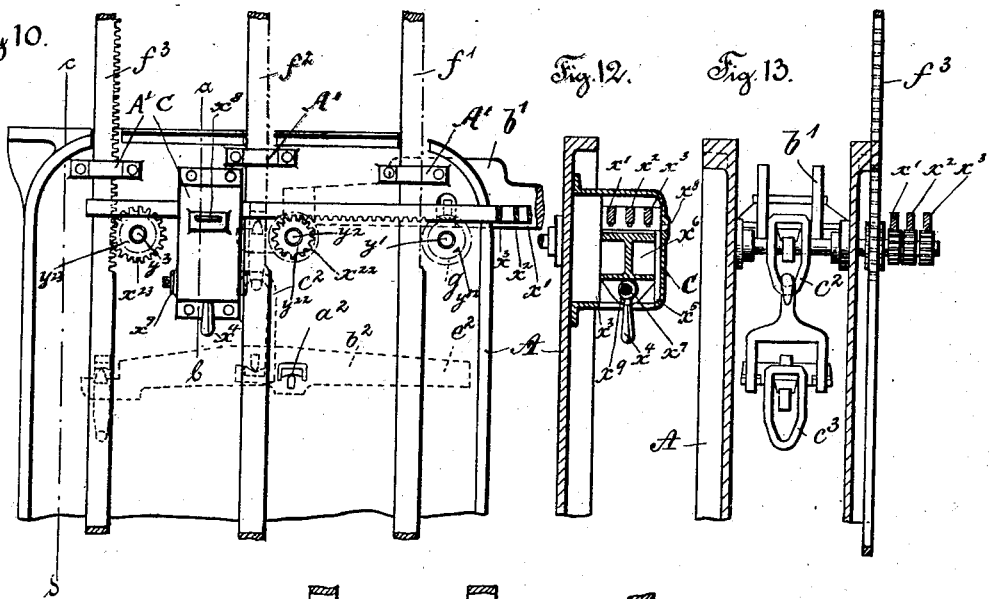
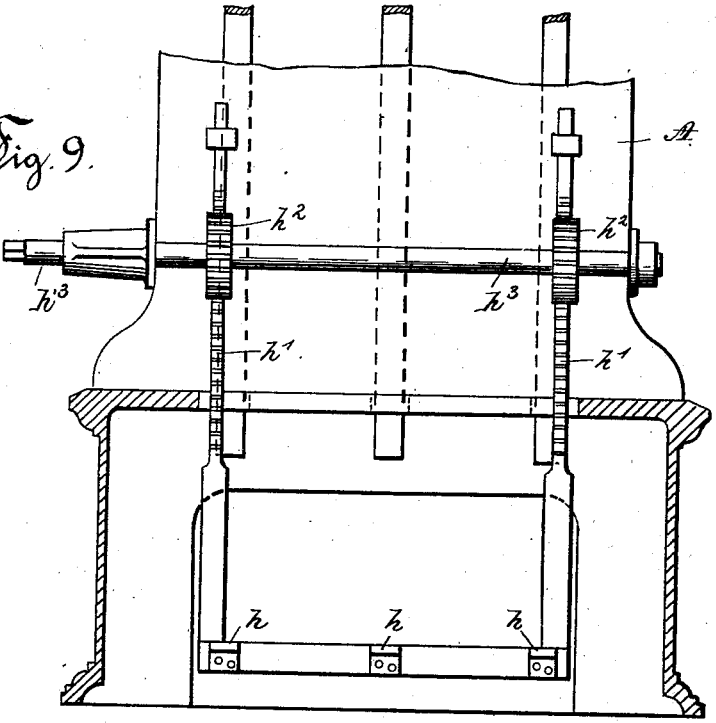

UNITED STATES PATENT OFFICE.

EMIL SCHENCK, OF DARMSTADT, GERMANY, ASSIGNOR TO CARL SCHENCK, EISENGIESSEREI UND MASCHINENFABRIK DARMSTADT, G. M. B. H., OF DARMSTADT, GERMANY, A FIRM.

AUTOMATIC WEIGHING-MACHINE.

SPECIFICATION forming part of Letters Patent No. 721,469, dated February 24, 1903.

Application filed January 7, 1901. Serial No. 42,417. (No model.)

*To all whom it may concern:*

Be it known that I, EMIL SCHENCK, mechanical engineer, residing at Landwehrstrasse 55, Darmstadt, in the Grand Duchy of Hesse, Germany, have invented new and useful Improvements in Automatic Weighing-Machines, (for which Letters Patent have been applied for in Germany, application $16,080^{VIII}/42^f$, dated June 13, 1900,) of which the following is a specification.

This invention relates to an automatic weighing-machine of the class in which there is a series of weighing-beams united by links and coming into play successively when a load is weighed. Thus the first beam indicates weights ranging from one thousand kilos to the maximum capacity of the weighing-machine in units of one thousand kilos, the second indicates weights ranging from one hundred to one thousand kilos in units of one hundred kilos, the third indicates weights ranging from ten to one hundred kilos in units of ten kilos, and the fourth indicates weights ranging from one to ten kilos in units of one kilo. It will be evident that all the beams must coöperate to indicate a weight above one thousand kilos the numerical expression of which does not contain a zero. The beams are connected with a registering device in such manner that at each weighing the different beams register figures indicating that part of the total load which the particular beam has weighed. Machines of this kind are arranged as sliding-weight machines, a weight being slid on each beam by means of a rack and pinion and a vertically-movable rack until the beam is counterpoised. The previous weighing-machines of this kind are described in German Patent No. 44,605 and also in my United States Patent No. 457,733 and with respect to the different weighing-beams and the movement of the sliding weights are arranged as follows: They are characterized by the fact that the sliding weights are moved within such limits and in such directions that the equilibrium position is overstepped and the excess weight corresponding with the value of the sliding weight and always becoming smaller is alternately carried over from the load side to the weight side, and vice versa. For example, suppose a load of seven thousand three hundred and sixty-two kilos is to be weighed. The first weighing-beam turns over on the load side when its sliding weight is in a position corresponding with a load of eight thousand kilos. The second beam is then liberated and turns when its sliding weight is in a position corresponding with a load of seven hundred kilos, and this is subtracted from the eight thousand kilos by the registering apparatus. The third beam turns when its sliding weight is in a position corresponding with seventy kilos, which is added to the previous number by the registering apparatus. Finally, the fourth beam turns when its sliding weight is in a position corresponding with eight kilos, which is subtracted by the registering apparatus.

By the present invention each sliding weight is moved during the weighing in the same direction from the load side to the weight side and by a special device is brought to rest before the equipoise, so that there is still an appropriate fraction of the load left to be weighed, as will be explained with reference to the accompanying drawings. It will be understood that in this case separate fractions of the load are successively weighed and all the weighings are added together by the registering device. This is achieved by stopping the sliding weight, as said, before the beam is in equilibrium. The desired result is effected by arranging a series of excess weights of different values, which are loaded onto the last beam, the equilibrium of which is shown by an indicator and scale. As this beam gradually sinks the excess weights are gradually taken off, the heaviest first and the lightest last, so that in the end the whole system of beams is in equilibrium without excess weight.

In the drawings is shown a weighing-machine constructed according to this invention with three beams; but the invention is equally applicable with any number of beams.

Figure 1 is a front view, and Fig. 2 a side view, of the machine, both partly in section. Figs. 3, 4, and 5 are sections through the separate weighing-beams on the lines 3 3, 4 4, and 5 5, respectively, of Fig. 1. Figs. 6 and 7 show the mechanism for liberating the beams in two different positions. Fig. 8 is an enlarged view of the vertical rack and the parts adjacent to it. Fig. 9 shows the mechanism for raising the vertical racks to the operative position. Fig. 10 shows a form of printing mechanism designed to print the weight registered on a ticket. Figs. 11, 12, and 13 are details of the printing mechanism, Figs. 12 and 13 being sections on lines $a\ b\ c\ d$ of Fig. 10, respectively.

In the frame A are supported three weighing-beams $b'\ b^2\ b^3$. $b'$ swings on the fixed knife-edge $a'$. $b^2$ rests on the knife-edge $a^2$ and is pulled in an upward direction by the beam $b'$ through the rod $c^2$. In similar manner the beam $b^3$ is supported at $a^3$ and is subjected to an upward pull through the rod $c^3$. The leverage is so arranged that the weight upon $b^3$ has the greatest effect. The load to be weighed is carried by the rod $c$ on the beam $b'$, and the beam $b^3$ carries an indicator $z$, which moves in front of a fiducial point $z'$. On the beams $b'\ b^2\ b^3$ are sliding weights $e'\ e^2\ e^3$, which have racks on their under sides with which pinions $g'\ g^2\ g^3$ engage, which pinions $g'$, $g^2$, and $g^3$ are journaled in the frame A of the machine and are situated directly beneath the knife-edges $a'$, $a^2$, and $a^3$, so that for all positions of the weighing-beams $b'$, $b^2$, and $b^3$ the racks on the under sides of the sliding weights $e'$, $e^2$, and $e^3$ always engage properly with the pinions $g'$, $g^2$, and $g^3$. The latter are turned by the vertical racks $f'\ f^2\ f^3$. Under the lower ends of these vertical racks there is a rail $h$, which can be raised and lowered by means of racks $h'\ h'$, pinion $h^2$ on shaft $h^3$, and lever-handle $h^4$. When this rail is raised, it lifts the racks $f'\ f^2\ f^3$, while when it is lowered the said racks do not at once descend. The racks $f'$, $f^2$, and $f^3$ are kept in engagement with the pinions $g'$, $g^2$, and $g^3$ by means of the guides A', affixed to the frame A of the machine. By means of an appropriate arrangement of detents the rack $f^3$ is allowed to descend first through a certain distance and then the rack $f^2$ descends similarly, the devices for effecting this being as follows: Beam $b^3$ carries a rod $k$, on which are pins $k^2$ and $k^3$. On these pins rest lever-arms $l^2\ l^3$, the weights of which are determined by the position and size of sliding weights $r^2\ r^3$. These levers are centered on fixed supports $s^2\ s^3$; but their turning movement is limited by stops $m^2\ m^3$. Against the inner ends of levers $l^2\ l^3$, which are supported by knife-edges bearing upon the supports $s^2\ s^3$, which are part of the frame A of the machine, and also against the inner end of beam $b^3$ bear the ends of levers $p^2\ p^3\ p'$, the other ends of which serve as detents, as will be described presently. Levers $p^2$ and $p^3$ are pivoted to one end of other levers $q^2$ and $q^3$, which are centered on fixed supports $o^2\ o^3$; but lever $p'$ is pivoted on a fixed support $o'$. The levers $p'\ p^2\ p^3$ have at their lower ends detent-hooks $p^{11}\ p^{21}\ p^{31}$, which engage with teeth in the racks $f'\ f^2\ f^3$ when the noses $p^{12}\ p^{22}\ p^{32}$ on the upper ends of the levers slide out of contact with the ends of the levers $b^3\ l^2\ l^3$. This action occurs successively as follows: If the detent $p^{31}$ engages with the rack $f^3$ while this is descending, the lever $p^3$ will be carried downward, taking with it the arm of the lever $q^3$ until the other arm of this lever strikes against the stop $n^3$; but by this movement of the lever $q^3$ the lever $i^3$ is moved, so that the detent $i^{32}$, which up till now has prevented the rack $f^2$ from descending, is released from its engagement in the notch which this rack $f^2$ carries. This rack therefore descends, and in a similar manner through the lever $p^2$, detent $p^{21}$, and lever $q^2$ raises the lever $i^2$ and disengages the detent $i^{22}$ from rack $f'$. The rack $f'$ then descends until the beam $b^3$ has obtained its equilibrium position and the detent $p^{11}$ falls into a tooth of the rack and arrests the latter.

It must be added that to insure uniform descent a pendulum escapement P of known construction is provided, and by means of this the racks $f'$, $f^2$, and $f^3$ are permitted to fall only step by step through the distance of a single tooth.

The form of escapement illustrated is operated as follows: Each of the racks $f'$, $f^2$, and $f^3$ is provided with teeth, which mesh with the pinions $t'$, $t^2$, and $t^3$, loosely mounted on the shaft $t^4$, which revolves in bearings $w'$ and $w^2$, supported on the frame A of the machine and prevented from moving longitudinally in one direction along the shaft $t^4$ by the bearing $w'$ and the collars $v^2$ and $v^3$ and in the other direction by the ratchet-wheels $t^{12}$, $t^{22}$, and $t^{32}$, which are affixed to the shaft $t^4$ and engage with spring-pawls $t^{11}$, $t^{21}$, and $t^{31}$, affixed to pinions $t'$, $t^2$, and $t^3$ in such a manner that the shaft $t^4$ will be caused to revolve by the downward motion of the racks $f'$, $f^2$, and $f^3$, but will remain stationary while the racks $f'$, $f^2$, and $f^3$ are being raised to the operative position. Affixed to shaft $t^4$ is spur-wheel $t^8$, which meshes with pinion $t^7$, affixed to shaft $t^5$, which is journaled in the escapement-frame B, supported by the frame A of the machine. Upon shaft $t^5$ is also affixed the escapement-wheel $t^6$, which is provided with the usual anchor $t^9$ and pendulum P. As the parts are so proportioned that the weight of the single rack $f'$ is sufficient to operate the escapement, it will be readily seen that the racks $f'$, $f^2$, and $f^3$ after being elevated to the operative position will descend step by step as the pendulum swings until they are stopped by the detent-hooks $p^{11}$, $p^{21}$, and $p^{31}$ of the levers $p'$, $p^2$, and $p^3$. I do not confine myself to an escapement of this precise form.

It is understood that while I have shown the racks $f'$, $f^2$, and $f^3$ as upright and therefore actuated by the force of gravity I do not limit myself to this form of construction, but may employ the well-known equivalent of a weight—viz., springs—to actuate the racks or other equivalents, and I desire it to be understood that where in the claims I speak of upright racks (actuated by gravity) I cover as an equivalent any construction in which the rack is under the action of a force tending to move it lengthwise.

The manner in which this automatic weighing-machine works will be understood from the following example: The sliding weight $e^3$ can counterbalance a load of one thousand kilos in steps of one hundred kilos, $e^2$ a load of two hundred kilos in steps of ten kilos, and $e'$ a load of twenty kilos in steps of one kilo. The pressure of the lever $l^3$ on the pin $k^3$ is so arranged that it corresponds with the load of one hundred and thirty-five kilos on the weigh-bridge, while the pressure of the lever $l^2$ on its pin $k^2$ corresponds with the load of fifteen kilos. Suppose that the load of eight hundred and seventy-two kilos is placed on the weigh-bridge, all the sliding weights are in their extreme right-hand position, and the vertical racks $f'$ $f^2$ are arrested by the levers $i^2$ $i^3$, while rack $f^3$ is still held at rest by the raising device $h$. The latter is moved downward and the apparatus put into action.

Period 1. The rack $f^3$ moves downward and drives the sliding weight $e^3$ onto the beam $b^3$ from right to left until the equilibrium has been attained and the beam sinks. Now as the beam $b^3$ receives the pressure from $l^3$ $l^2$ of $135+15=150$ kilos it will sink as soon as $e^3$ has been moved up to that point which corresponds with the load of $872-150=722$ kilos—that is to say, between the division-marks "700" and "800" on the vertical rack $f^3$. The lever $l^3$ now lies against the stop $m^3$ and its pressure on the beam $b^3$ is removed and the system of levers comes to rest. At the same time the lever $p^3$ has slid out of contact with the lever $l^3$, and its detent has engaged in the rack $f^3$. If this latter is marked at every one hundred divisions, it will stop at the eight hundredth. Its weight acts on the lever $q^3$ and disengages the detent $i^{32}$ from the rack $f^2$, which thus begins to descend.

Period 2. During the downward movement of the rack $f^2$ the sliding weight $e^2$ is driven along the beam $b^2$. As the sliding weight $e^3$ has already weighed eight hundred kilos, there still remain seventy-two kilos for the other sliding weights. The lever $l^2$ is bearing on the beam $b^3$ with a pressure of fifteen kilos. It follows that the movement of the sliding weight $e^2$ will bring it in its position of equilibrium when it has come to the position corresponding with $72-15=57$ kilos. At this moment the beam will sink until the stop $m^2$ has relieved the pressure of the lever $l^2$. The lever $p^2$ will now be disengaged from lever $l^3$ at fifty-seven kilos, and the arresting of the rack $f^2$ will be at the next following division—namely, sixty kilos. The weight of this rack $f^2$ moves the lever $q^2$ and disengages the detent $i^{22}$ from the rack $f'$, which therefore can descend.

Period 3. The sliding weights $e^3$ and $e^2$ have weighed eight hundred and sixty kilos, respectively, so that the final weight $e'$ has still to weigh $872-860=12$ kilos. There is no longer any excess weight of the rod $k$, so that the equilibrium and the final sinking of beam $b^3$ ensues when the sliding weight $e'$ stands at the point corresponding with twelve kilos. At this moment the stop on the lever $p'$ will have slid out of contact with the end of the beam $b^3$, so that the rack $f'$ and with it the sliding weight $e'$ are stopped. The weighing-machine has now completed its action and the sliding weights stand at "800," "60," and "12," respectively—that is, a total of eight hundred and seventy-two kilos.

By means of a registering device the values represented by the separate sliding weights are united to one number, which can be read or can be printed on a ticket.

The values represented by the separate sliding weights may be indicated by a registering device adapted to print the weight directly upon a card, as is illustrated in Figs. 10, 11, 12, and 13; but I do not confine myself to this precise form of printing device, which is described as follows: The racks $f^2$ and $f^3$ each engage with pinions $x^{22}$ and $x^{23}$, which are affixed to shafts $y^2$ and $y^3$, journaled in the frame A of the machine, upon which shafts and also upon the shaft $y'$, to which the pinion $g'$ is affixed, are also affixed the pinions $y^{12}$, $y^{22}$, and $y^{23}$, which mesh with racks on the under sides of type-bars $x'$, $x^2$, and $x^3$, which are provided with numeral-type, as shown in Fig. 11, and pass through suitable guides in the casing C, supported by the frame A of the machine in proximity to a platen $x^6$, sliding up and down upon guides $x^5$ and arranged to be pressed against the numeral-type on the bars $x'$, $x^2$, and $x^3$ by an eccentric $x^7$, arranged to turn on shaft $x^9$ and actuated by a suitable handle $x^4$ in such a manner as to print or emboss the numerals upon a card to be inserted through an aperture $x^8$ in the casing C.

The range of the numerals on each type-bar $x'$ $x^2$ $x^3$ should be the same as that of the corresponding scale-beams $b'$, $b^2$, and $b^3$, respectively. Thus Fig. 11 illustrates the type-bar $x^3$ having ten numerals corresponding to the ten steps of one hundred kilograms each, which constitute the range of the movement of the sliding weight $e^3$ on the scale-beam $b^3$. Since the range of movement of the weights $e^2$ and $e'$ on the scale-beams $b^2$ $b'$, respectively, embraces twenty steps, (each of ten kilograms and one kilogram, respectively,) the type-bars $x^2$ $x'$ will each have a scale of twenty numerals.

Now what I claim, and desire to secure by Letters Patent, is the following:

1. In an automatic weighing-machine, the combination of weighing-beams one of which is a load-beam, with sliding weights on said beams, means to move the weights on the beams, and means operated by the movement of a beam to stop the movement of the individual weights on the beams other than the load-beam, before equilibrium of the entire system of beams is arrived at.

2. In an automatic weighing-machine, the combination, with a series of weighing-beams, provided with sliding weights, of a series of additional weights resting on the last weighing-beam, and means to enable said additional weights to be taken off said last weighing-beam substantially as described.

3. In an automatic weighing-machine the combination with a series of weighing-beams provided with sliding weights of a series of weighted levers connected with the weighing-beams and a series of stops in the path of the levers adapted to arrest their descent and support their weight substantially as described.

4. In an automatic weighing-machine the combination with a series of weighing-beams provided with sliding weights and upright racks for imparting motion to the said sliding weights of couples of detents connected with sundry of the racks and one of which is adapted to hold each of such racks in its uppermost position and the other of which is to catch it at the proper point of descent of the corresponding weighing-beam, substantially as described.

5. In a weighing-machine, the combination of weighing-beams, one of which is a load-beam, with sliding weights on said beams, means for moving said weights on said beams, and means, brought into action by the movement of a beam, to stop the movement of the individual weights on the beams other than the load-beam, before the equilibrium of the entire system of beams is arrived at.

6. In an automatic weighing-machine the combination with a series of weighing-beams provided with sliding weights of a series of levers connected with the weighing-beams, a series of stops adapted to catch the said levers at a predetermined point of their descent, a series of detent-hooks controlled by the said levers and adapted to engage vertical racks, which actuate the sliding weights substantially as described.

7. In an automatic weighing-machine, the combination, with weighing-beams, of sliding weights on said beams, upright racks for imparting motion to said weights, detent-hooks pivoted on stationary supports and adapted to engage sundry of the racks to hold them temporarily in their initial position, levers, actuated by the movement of a beam, and provided with hooks or catches to arrest the racks, and a releasing connection from the lever of one rack to the detent-hook of the next succeeding rack.

8. In a weighing-machine, the combination of a series of connected weighing-beams, weights movably carried by said beams, individual operating devices for moving each of said weights, additional weights arranged to bear on the last weighing-beam, and mechanism, governed by each of said additional weights, for locking one of said operating devices and practically at the same time releasing the next operating device.

9. In a weighing-machine, the combination of a series of connected weighing-beams, weights movably carried by said beams, individual operating devices for moving each of said weights, mechanism for arresting the weights on all the beams but the load-beam, before equilibrium of the entire system of beams is obtained.

In testimony whereof I have signed my name to this specification in the presence of two subscribing witnesses.

EMIL SCHENCK.

Witnesses:
FRIEDRICH QUEHL,
EVA SATTLER.